(12) United States Patent
Carayon et al.

(10) Patent No.: US 7,162,904 B2
(45) Date of Patent: Jan. 16, 2007

(54) METHOD FOR PRODUCING A BUNG FOR A METAL CASK

(75) Inventors: Jean-Claude Carayon, Ventabren (FR); Lucien Brun, Troyes (FR)

(73) Assignee: Gallay S.A. (FR)

(*) Notice: Subject to any disclaimer, the term of this patent is extended or adjusted under 35 U.S.C. 154(b) by 451 days.

(21) Appl. No.: 10/201,455

(22) Filed: Jul. 19, 2002

(65) Prior Publication Data

US 2004/0011104 A1  Jan. 22, 2004

(51) Int. Cl.
    *B21D 3/02* (2006.01)
(52) U.S. Cl. ............... 72/117; 72/20; 72/125
(58) Field of Classification Search ............ 72/70, 72/112, 113, 115, 117, 124, 125
    See application file for complete search history.

(56) References Cited

U.S. PATENT DOCUMENTS

| 4,399,679 | A | * | 8/1983 | King ............... 72/117 |
| 5,237,849 | A | | 8/1993 | Miyazawa |
| 5,297,411 | A | * | 3/1994 | Scrimshaw ........... 72/70 |
| 5,709,313 | A | | 1/1998 | Richoux et al. |
| 6,000,263 | A | * | 12/1999 | Enami ............... 72/70 |

FOREIGN PATENT DOCUMENTS

| DE | 1527828 | * | 6/1970 | ....... 72/117 |
| FR | WO 92/09496 | | 6/1992 | |
| FR | WO 01/53021 A2 | | 7/2001 | |
| WO | BIF114145/WO | | 3/2002 | |

* cited by examiner

*Primary Examiner*—Ed Tolan
(74) *Attorney, Agent, or Firm*—VanOphem & VanOphem, P.C.

(57) ABSTRACT

A method for producing a bung for a metal cask that does not require a conventional collar and seal, and that simplifies the operations for forming the bung. The method disclosed in the present application includes the following steps. First, a prestamping operation creates a preforming dome in the wall of the cask such that a cuvett is formed. Second, an approximately cylindrical shaft is formed by stamping and thus puncturing the wall of the cask at the location of the bung. Third, the protruding edge of the shaft is folded down the to form an external rolled edge. Fourth, encircling the shaft with a rigid ring constituted by at least two annular sections such that the metal does not tear during the formation of the threads. Finally, the method of the present invention includes the step of implementing a roller threading head to form internal threads in the shaft.

15 Claims, 1 Drawing Sheet

METHOD FOR PRODUCING A BUNG FOR A METAL CASK

CROSS-REFERENCES TO RELATED APPLICATIONS

The national application claims the benefit of prior filed French Patent Application No. 00/00638, filed on Jan. 19, 2000 and prior filed PCT Application No. WO 01/53021, filed on Jan. 18, 2001.

BACKGROUND OF THE INVENTION

1. Field of the Invention

The present invention relates to a method for producing a bung for a metal cask, in particular producing a bung for a relatively thin-walled cask, typically less than 2 mm thick. It relates to an improvement making it possible to simplify the production of such a bung and to reduce the cost price.

2. Description of the Related Art

A well known method for producing a bung for a metal cask, in particular a thin-walled cask, includes slipping onto the wall of the cask a collar which is prefabricated, relatively thick and internally threaded. Such a collar has a flat octagonally-shaped base. The wall of the cask is pierced and the metal is shaped around the piercing by making both an octagonal impression on the internal side and a cylindrical shaft extending outwards. The collar is inserted in the shaft in such a way that its octagonal base fits into the corresponding impression, with the insertion of a seal. The fixing of the collar is ensured by its rolled edge on the rim of the shaft.

BRIEF SUMMARY OF THE INVENTION

The present invention makes it possible to purely and simply do away with the collar and the seal while simplifying the operations for forming the bung. To this end, the invention relates to a process or method for producing a bung for a metal cask. The method includes forming an approximately cylindrical shaft by stamping the wall of the cask, and forming a thread inside this shaft.

For thin sheet metal, roller form threading is used making it possible to obtain the thread without removing any metal. It should be noted that this type of roller form threading is not usually possible on thin sheet metal. Advantageously, however, the shaft is reinforced on the outside during the formation of the thread to avoid any risk of tearing the sheet metal. In order to do this the shaft can, for example, be encircled by a rigid ring, optionally constructed by several sections which bear on the outside of the shaft in such a way as to hold it during formation of the thread.

In addition, before piercing the wall of the cask, which initializes the formation of the shaft, a prestamping is advantageously carried out leading to the creation of a preforming dome. The peripheral part of this dome remains at the base of the shaft, which creates a sort of cuvette or depression encouraging the complete emptying of the cask at the end of use. Optional cleaning of the cask is also greatly facilitated by this arrangement.

The invention will be better understood in the light of the description which follows, given only by way of example and with reference to the attached drawings in which:

DETAILED DESCRIPTION OF THE PREFERRED EMBODIMENT

The drawings illustrate the main operations for forming a bung for a metal cask in accordance with the principle of the invention. The bung is formed in an outside wall 11 of a cask, which is flat or very slightly domed; the bung can also be created in the cylindrical wall of the cask. A first operation illustrated in FIG. 1 includes creating a slight dome 12, by deforming the sheet metal in the wall 11 from the inside toward the outside at the desired location of the bung. An internal cuvette or depression is thus defined. The second operation illustrated in FIG. 2 includes forming an approximately cylindrical shaft 14 by stamping and thus puncturing the wall of the cask at the location of the bung. Because of this, the shaft is connected to the rest of the wall 11 via the peripheral part of the internal cuvette in a relatively pronounced rounded manner that is of such a nature as to subsequently encourage the complete emptying of the cask.

Figure 1:
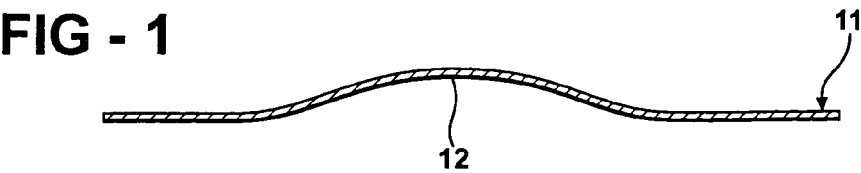
FIGS. 1 to 5 illustrate successive operations for forming a bung in a wall of a metal cask according to the present invention.
Figure 2:
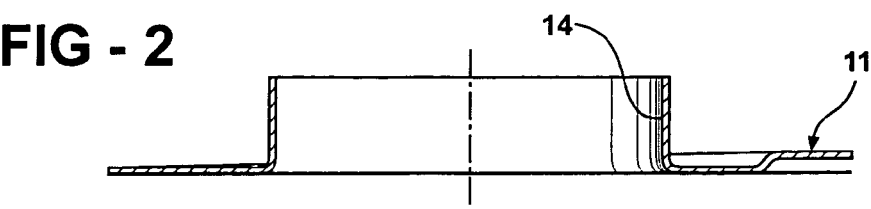
Figure 3:
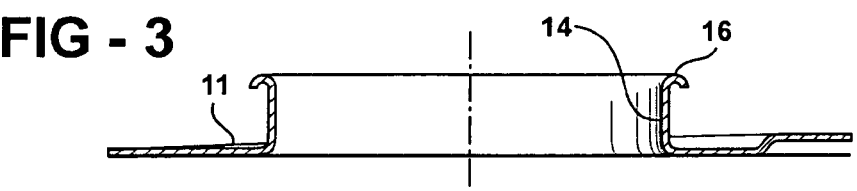

A third operation illustrated in FIG. 3 includes folding down the protruding edge of the shaft to form an external rolled edge 16. The tooling equipment needed to carry out the operations illustrated in FIGS. 1 to 3 are standard and have therefore not been represented.

Figure 4:
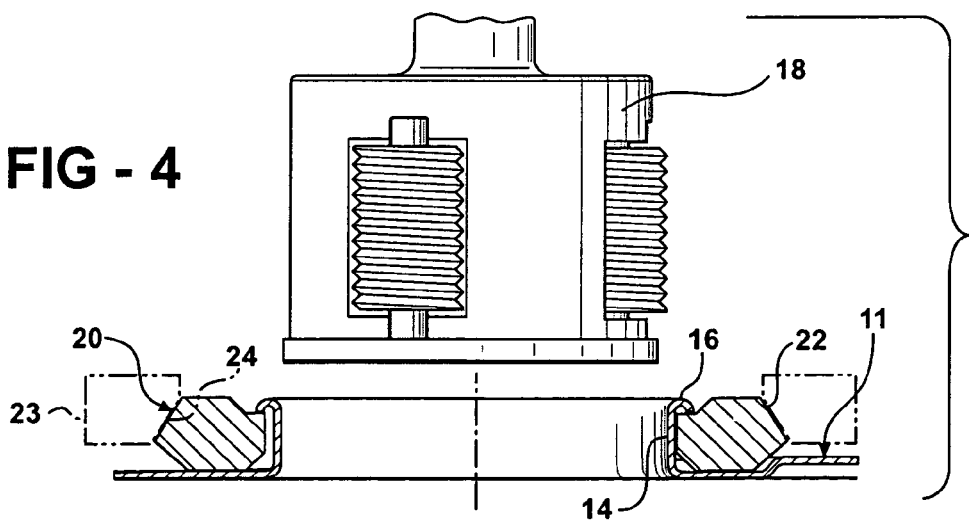

FIG. 4 illustrates a stage that is more particularly representative of the method of the present invention. This stage takes place after the formation of the rolled edge 16. It includes forming a thread inside the shaft. When thin sheet metal is involved, the threading is carried out without removing any metal by using deformation or roller form threading. FIG. 4 shows a roller form threading head 18 before the threading operation. To eliminate any risk of tearing the metal, the shaft is encircled by a rigid ring 20, constituted by at least two annular sections, during the creation of the screw thread. This ring or any similar structure defines a cylindrical annular stop that is applied against the external face of the shaft 14. The sections of the ring define an external tapered bearing surface 22. An external annular one-piece support 23 has a complementary tapered bearing surface (not represented) that bears against the tapered bearing surface 22 in order to keep the sections in place during the threading operation. The one-piece support is shown in broken lines in FIG. 4.

Figure 5:
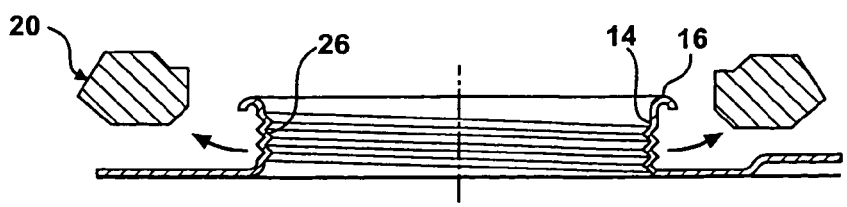

FIG. 5 illustrates the withdrawal of the sections constituting the rigid ring 20 after a thread 26 is formed in the wall of the shaft 14.

The method has been tested with success on casks made of sheet metal less than 1 mm thick, typically 0.7 to 0.8 mm, for the production of bungs of different sizes ranging from 25 to 60 mm.

What is claimed is:

1. A method for creating a bung for a cask, said method comprising the steps of:

puncturing a surface of said cask at a predetermined location of said bung;

forming a single thickness layer shaft at said predetermined location of said bung, said single thickness shaft extending in a substantially traverse direction away from said surface of said cask, said single thickness layer shaft further terminating with a protruding edge;
folding said protruding edge of said single thickness layer shaft to form an external rolled edge at said protruding edge;
forming a plurality of threads on an internal portion of said single thickness layer shaft, said plurality of threads being formed after said formation of said external rolled edge, said forming step further comprising implementing a roller threading head to form said plurality of threads in said internal portion of said single thickness layer shaft, whereby said plurality of threads are formed without removing any material;
reinforcing an external portion of said single thickness layer shaft during formation of said plurality of threads, said reinforcing step further comprising placing a rigid ring having at least two annular sections below said external rolled edge and adjacent said single thickness layer shaft, said two annular sections each having an inner cylindrical surface adapted to reinforce said external portion of said single thickness layer shaft.

2. The method according to claim 1, wherein said step of reinforcing said external portion of said shaft further comprises providing an external annular one-piece support having a tapered bearing surface engaging an external tapered bearing surface on said at least two annular sections of said rigid ring, whereby said external annular one-piece support retains the position of said at least two annular sections of said rigid ring during formation of said plurality of threads.

3. The method according to claim 1 comprising the step of deforming a surface of said metal cask at said predetermined location of said bung before said surface of said cask is punctured, said surface being deformed such that a preforming dome is created, said preforming dome having a peripheral portion that forms an internal depression whereby said internal depression defines a base portion of said single thickness layer shaft.

4. The method according to claim 1, wherein said step of puncturing said surface of said cask at said predetermined location of said bung comprises puncturing an outside wall of said cask.

5. The method according to claim 1, wherein the step of puncturing said surface of said cask at said predetermined location of said bung comprises puncturing a cylindrical wall of said cask.

6. The method according to claim 1, wherein said step of puncturing said surface of said cask at said predetermined location of said bung comprises stamping said surface of said cask to create a hole therein, said stamping operation drawing material surrounding said hole in a direction away from said surface of said cask to form said single thickness layer shaft.

7. The method of creating a bung for a cask as claimed in claim 1 herein said surface of said cask is formed to be less than two millimeters in thickness.

8. A method for creating a bung for a metal cask having an outside wall and at least one cylindrical wall, said method comprising the steps of:
deforming a surface of said metal cask at a predetermined location of said bung, said surface being deformed such that a preforming dome is created, said preforming dome having a peripheral portion that forms an internal depression;
puncturing said surface of said metal cask at said predetermined location of said bung;
forming a single thickness layer shaft at said predetermined location of said bung, said single thickness layer shaft having a base portion defined by said internal depression, said single thickness layer shaft extending in a direction away from said internal depression and terminating in a protruding edge, said single thickness layer shaft further having an internal portion and an external portion;
folding down said protruding edge of said single thickness layer shaft thereby forming an external rolled edge;
implementing a roller threading head to form a plurality of threads on said internal portion of said single thickness layer shaft, said plurality of threads being formed after said formation of said external rolled edge whereby said plurality of threads are formed without removing any material;
reinforcing said external portion of said single thickness layer shaft during formation of said plurality of threads, said reinforcing step further comprising placing a rigid ring having at least two annular sections below said external rolled edge and adjacent said single thickness layer shaft, said two annular sections each having an inner cylindrical surface adapted to reinforce said external portion of said single thickness layer shaft.

9. The method according to claim 8, wherein said step of reinforcing said external portion of said single thickness layer shaft further comprises providing an external annular one-piece support having a tapered bearing surface engaging an external tapered bearing surface of said at least two annular sections of said rigid ring, whereby said external annular one-piece support retains the position of said at least two annular sections of said rigid ring during said formation of said plurality of threads.

10. The method according to claim 8, wherein said step of puncturing said surface of said metal cask at said predetermined location of said bung comprises puncturing said outside wall of said metal cask.

11. The method according to claim 8, wherein said step of puncturing said surface of said metal cask at said predetermined location of said bung comprises puncturing said at least one cylindrical wall of said metal cask.

12. The method according to claim 8, wherein said step of puncturing said surface of said metal cask at said predetermined location of said bung comprises stamping said surface of said metal cask to create a hole therein, said stamping operation drawing material surrounding said hole in a direction away from said surface of said metal cask to form said single thickness layer shaft.

13. The method of creating a bung for a cask as claimed in claim 8 wherein said surface of said cask is formed to be less than two millimeters in thickness.

14. A method for creating a bung for a metal cask having an outside wall and at least one cylindrical wall, said wall of said metal cask defining a containment region containing a fluid, said method comprising the steps of:
deforming a surface of said metal cask at a predetermined location of said bung, said surface being deformed such that a preforming dome is created, said preforming dome having a peripheral portion that forms an internal depression, said internal depression facilitating draining said fluid from said containment region of said metal cask;
stamping said surface of said metal cask to create a hole at said predetermined location of said bung, said stamping operation drawing material surrounding said hole in a direction away from said surface of said metal cask to form a single thickness layer cylindrical shaft, said cylindrical shaft having a base portion defined by said internal depression, said single thickness layer cylindrical shaft extending in a direction away from said internal depression and terminating at a protruding edge, said single thickness layer cylindrical shaft further having an internal portion and an external portion;

folding down said protruding edge of said single thickness layer cylindrical shaft thereby forming an external rolled edge;

placing a rigid ring having at least two annular sections below said external rolled edge and adjacent said single thickness layer cylindrical shaft, said two annular sections each having a cylindrical inner surface adapted to reinforce said external portion of said single thickness layer cylindrical shaft, said at least two annular sections each having an external tapered bearing surface;

providing an external annular one-piece support having a tapered bearing surface adapted to engage said external tapered bearing surface of each of said at least two annular sections of said rigid ring; and implementing a roller threading head to form a plurality of threads on said internal portion of said single thickness layer cylindrical shaft, said plurality of threads being formed after said formation of said external rolled edge whereby said plurality of threads are formed without removing any material.

15. The method of creating a bung for a cask as claimed in claim 14 wherein said surface of said cask is formed to be less than two millimeters in thickness.

* * * * *

UNITED STATES PATENT AND TRADEMARK OFFICE
CERTIFICATE OF CORRECTION

PATENT NO. : 7,162,904 B2  
APPLICATION NO. : 10/201455  
DATED : January 16, 2007  
INVENTOR(S) : Jean-Claude Carayon and Lucien Brun Page 1 of 2

It is certified that error appears in the above-identified patent and that said Letters Patent is hereby corrected as shown below:

On Title Page

In the Abstract item 57, Line 6, kindly delete "cuvett" and insert --cuvette--.

In the Abstract item 57, Line 9, after "down" kindly delete "the".

Column 2, Line 22, after "wall" kindly insert --11--.

Column 2, Line 23, after "shaft" kindly insert --14--.

Column 2, Line 29, after "shaft" kindly insert --14--.

Column 2, Line 35, before "rolled" kindly insert --external--.

Column 2, Line 36, after "shaft" kindly insert --14--.

Column 2, Line 41, after "shaft" kindly insert --14--.

Column 2, Line 43, kindly delete "ring" and insert --rigid ring 20--.

Column 2, Line 46, kindly delete "ring" and insert --rigid ring 20--.

Column 2, Line 49, before "tapered" kindly insert --external--.

Column 2, Line 50, before "one-piece" kindly insert --external annular--.

Column 2, Line 51, after "support" kindly insert --23--.

Column 2, Line 66, after "thickness" kindly insert --layer--.

Column 2, Line 67, kindly delete "away".

Column 3, Claim 1, Line 13, after "material;" kindly insert --and--.

Column 3, Claim 3, Line 30, after "claim 1", kindly insert --, further--.

Column 3, Claim 3, Line 31, kindly delete "metal".

Column 3, Claim 7, Line 54, kindly delete "herein" and insert --, wherein--.

UNITED STATES PATENT AND TRADEMARK OFFICE
CERTIFICATE OF CORRECTION

PATENT NO. : 7,162,904 B2
APPLICATION NO. : 10/201455
DATED : January 16, 2007
INVENTOR(S) : Jean-Claude Carayon and Lucien Brun It is certified that error appears in the above-identified patent and that said Letters Patent is hereby corrected as shown below:

Column 4, Claim 13, Line 48, kindly delete "8" and insert --8,--.

Column 4, Claim 14, Line 51, kindly delete "wall" and insert --walls--.

Column 4, Claim 14, Line 65, after "said" kindly insert --single thickness layer--.

Column 6, Claim 15, Line 11, before "cask" kindly insert --metal--.

Column 6, Claim 15, Line 12, kindly delete "14" and insert --14,--.

Column 6, Claim 15, Line 12, before "cask" kindly insert --metal--.

Signed and Sealed this

Twenty-second Day of May, 2007

JON W. DUDAS
*Director of the United States Patent and Trademark Office*